United States Patent
Gonzalez Carrillo

(10) Patent No.: US 10,946,781 B2
(45) Date of Patent: Mar. 16, 2021

(54) VEHICLE FLOOR MAT RETAINER

(71) Applicant: GM GLOBAL TECHNOLOGY OPERATIONS LLC, Detroit, MI (US)

(72) Inventor: Juan Carlos Gonzalez Carrillo, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 16/381,409

(22) Filed: Apr. 11, 2019

(65) Prior Publication Data
US 2020/0324679 A1  Oct. 15, 2020

(51) Int. Cl.
B60N 3/04 (2006.01)

(52) U.S. Cl.
CPC .............. B60N 3/046 (2013.01); B60N 3/044 (2013.01)

(58) Field of Classification Search
CPC .......... Y10T 16/10; B60N 3/046; B60N 3/044
USPC ................................. 296/97.23; 24/662; 16/4
See application file for complete search history.

(56) References Cited

U.S. PATENT DOCUMENTS

| | | | | |
|---|---|---|---|---|
| 4,067,155 A * | 1/1978 | Ruff | ...................... | E04B 1/6803 4/498 |
| 5,192,599 A * | 3/1993 | Sakamoto | .......... | A47G 27/0418 16/16 |
| 5,390,397 A * | 2/1995 | Kremer | .................. | B60N 3/046 24/351 |
| 6,086,130 A * | 7/2000 | Ehrhardt | .................. | B60N 3/04 16/4 |
| 6,381,806 B1 * | 5/2002 | Stanesic | ................. | B60N 3/046 16/4 |
| 7,727,612 B2 | 6/2010 | Haraguchi et al. | | |
| 7,752,718 B2 * | 7/2010 | Fisher | ................ | A44B 17/0035 24/114.4 |
| 7,945,992 B2 * | 5/2011 | Parisi | ..................... | B60N 3/046 16/4 |
| 8,375,514 B2 | 2/2013 | Dendo | | |
| 8,495,791 B2 * | 7/2013 | Yoon | ...................... | B60N 3/046 16/6 |
| 8,756,758 B2 | 6/2014 | Dendo | | |
| 8,757,698 B1 * | 6/2014 | Rowland | ................ | B60N 3/044 296/97.23 |
| 9,254,771 B2 | 2/2016 | Brown et al. | | |
| 9,919,630 B2 | 3/2018 | Takenaka et al. | | |
| 10,173,570 B2 | 1/2019 | Dresen-Rausch et al. | | |
| 10,512,350 B1 * | 12/2019 | Cranen | .............. | A47G 27/0418 |
| 2005/0239320 A1 * | 10/2005 | Folkema | ............... | A47G 27/045 439/404 |
| 2007/0011844 A1 * | 1/2007 | Aoki | ....................... | B60N 3/046 16/4 |
| 2010/0122429 A1 * | 5/2010 | Gonzalez | ............... | B60N 3/046 16/4 |
| 2013/0049396 A1 * | 2/2013 | Goto | ...................... | B60N 3/046 296/97.23 |
| 2013/0314933 A1 * | 11/2013 | Wang | ..................... | B60Q 1/24 362/494 |

\* cited by examiner

Primary Examiner — Pinel E Romain

(57) ABSTRACT

A vehicle floor mat retainer includes a vehicle carpet portion including an engagement portion connected by a first hinge to a carpet retainer portion, and a vehicle floor mat portion including a cap portion connected by a second hinge to a floor mat retainer portion.

16 Claims, 4 Drawing Sheets

VEHICLE FLOOR MAT RETAINER

FIELD

The present disclosure relates to vehicle floor mat retainer.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicle floor mats may be positioned in a floor space of a vehicle to protect the floor of the vehicle from dirt and/or wear. For example, in the floor area in a vehicle in front of a driver seat a floor mat may be positioned in order to protect the vehicle floor from abrasion due to movement of the driver's feet, especially while operating the pedals. It is desirable to secure the floor mats so as to avoid and/or prevent unintentional motion of the floor mat within the vehicle. Conventional vehicle floor mats are secured in position through a plurality of retainers.

SUMMARY

In an exemplary aspect, a vehicle floor mat retainer includes a vehicle carpet portion including an engagement portion connected by a first hinge to a carpet retainer portion, and a vehicle floor mat portion including a cap portion connected by a second hinge to a floor mat retainer portion.

In this manner, a vehicle floor mat may be fixed in orientation and retained to a vehicle carpet with a single vehicle floor mat retainer.

In another exemplary aspect, the carpet retainer portion is connected to the first hinge at a proximal end and includes a first latch feature at a distal end.

In another exemplary aspect, the engagement portion includes a slot that is configured to receive the first latch feature.

In another exemplary aspect, the floor mat retainer portion is connected to the second hinge at a proximal end and includes a second latch feature at a distal end.

In another exemplary aspect, the cap portion includes a slot that is configured to receive the second latch feature.

In another exemplary aspect, the engagement portion includes an elongate protrusion extending from a surface of the engagement portion.

In another exemplary aspect, the floor mat retainer portion defines a first opening that is configured to allow the elongate protrusion to pass therethrough.

In another exemplary aspect, the cap portion defines an internal opening that is configured to selectively capture the elongate portion.

In another exemplary aspect, the elongate portion is mushroom shaped in cross-section.

In another exemplary aspect, the internal opening is mushroom shaped in cross-section.

In another exemplary aspect, the elongate protrusion is more than twice as long as it is wide.

In another exemplary aspect, the elongate protrusion is more than three times as long as it is wide.

In another exemplary aspect, the elongate protrusion is more than four times as long as it is wide.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
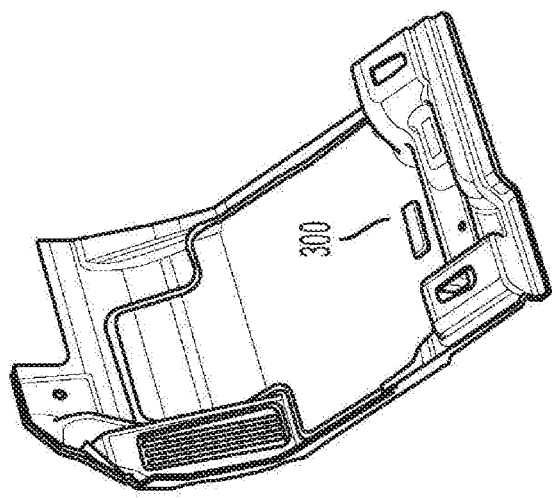
FIG. 1 is a perspective view of a vehicle floor.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Figure 2:
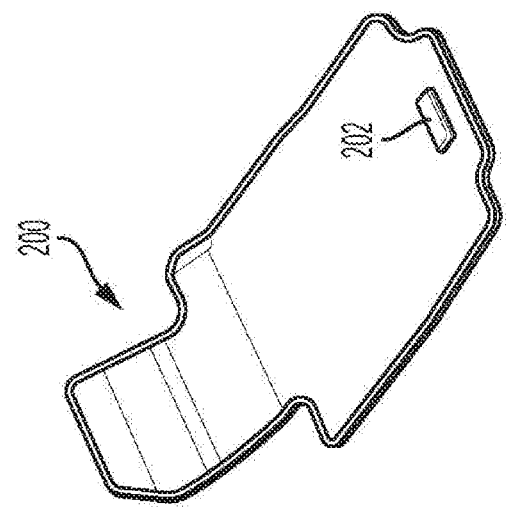
FIG. 2 is a perspective view of a vehicle floor mat.
Figure 3:
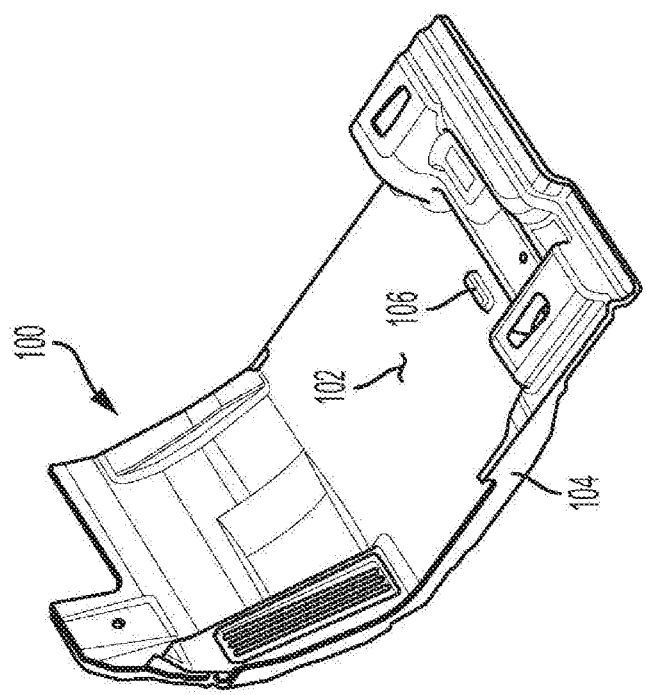
FIG. 3 is a perspective view of the vehicle floor mat of FIG. 2 installed on the vehicle floor of FIG. 1 with an exemplary embodiment of a vehicle floor mat retainer in accordance with the present disclosure.

Referring now to the drawings, wherein like reference numbers correspond to like or similar components throughout the several figures, FIG. 1 is a perspective view of a vehicle floor 100. The vehicle floor 100 includes a vehicle floor carpet 102 supported by an underlying vehicle floor support 104. A vehicle carpet portion 106 of an exemplary vehicle floor mat retainer is installed in the vehicle floor carpet 102. FIG. 2 is a perspective view of a vehicle floor mat 200. A vehicle floor mat portion 202 of an exemplary vehicle floor mat retainer is installed in the vehicle floor mat 200. FIG. 3 is a perspective view of the vehicle floor mat 200 of FIG. 2 installed on the vehicle floor 100 of FIG. 1 with an exemplary embodiment of a vehicle floor mat retainer 300 in accordance with the present disclosure. The vehicle floor mat retainer 300 includes a vehicle carpet portion 106 and a vehicle floor mat portion 202.

Figures 4A, 4B, 4C:
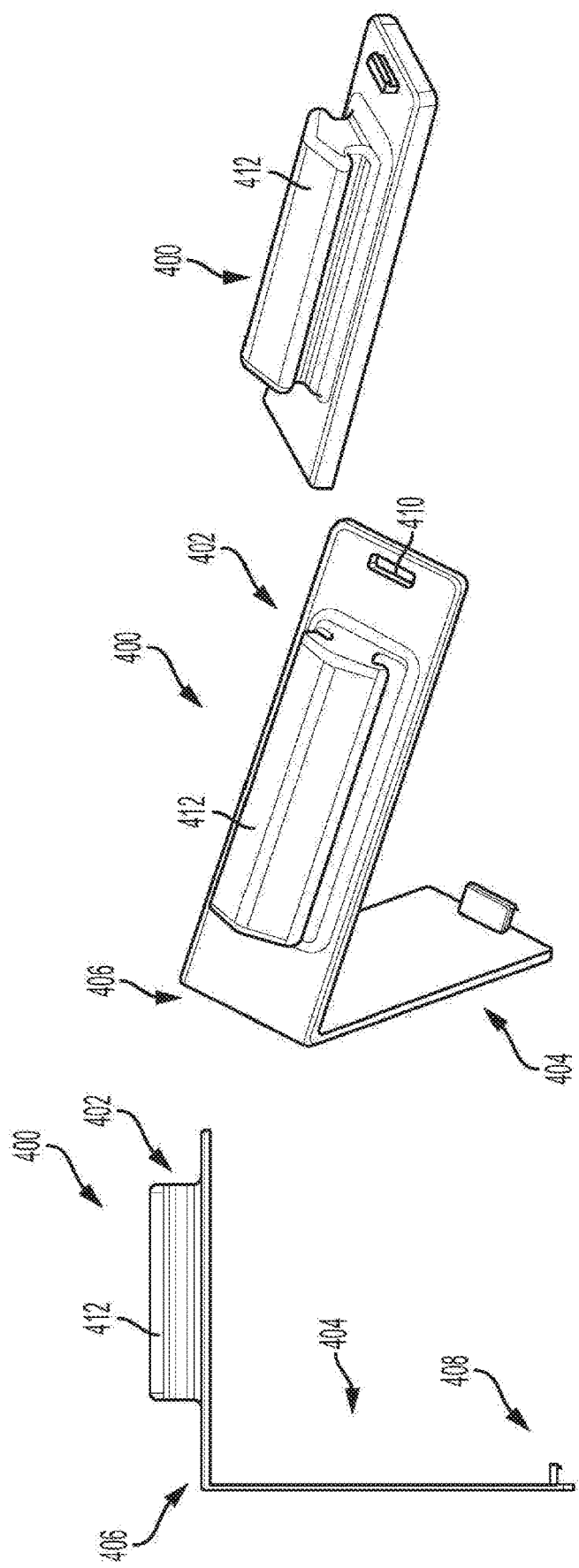
FIG. 4A is an elevation view of a vehicle carpet portion of an exemplary vehicle floor mat retainer of the present disclosure in an open configuration.
FIG. 4B is a perspective view of the vehicle carpet portion of FIG. 4A in the open configuration.
FIG. 4C is a perspective view of the vehicle carpet portion in a closed configuration.

FIGS. 4A-4C illustrate an exemplary vehicle carpet portion 400 of an exemplary vehicle floor mat retainer in accordance with the present disclosure. The vehicle carpet portion 400 includes an engagement portion 402 and a carpet retainer portion 404 that are connected to each other with a hinge 406. The carpet retainer portion 404 is connected to the hinge 406 at a proximal end and includes a latch feature 408 at a distal end. The engagement portion 402 includes a slot 410 that is configured to receive the latch feature 408 when the engagement portion 402 and the carpet retainer portion 404 are pivoted toward each other via the hinge 406 as illustrated in FIG. 4C. The vehicle carpet portion 400 is designed to be received by and retained in a vehicle carpet (not illustrated). The vehicle carpet will include an opening through which an installer may pass the carpet retainer portion 404 and then hinged upward so that the latch feature 408 passes through another opening in the vehicle carpet to be captured by the slot 410. In this manner, the vehicle carpet portion 400 is secured to the vehicle carpet.

The vehicle carpet portion 400 of the exemplary vehicle floor mat retainer further includes an elongate protrusion 412 that extends upwardly from a surface of the engagement portion 402. The orientation of the vehicle carpet portion 400 with respect to the vehicle carpet in which it is installed is fixed because the vehicle carpet portion 400 engages with the carpet at two locations. The first location being a first opening in the carpet though which the carpet retainer portion 404 has passed and the second location being the second opening through which the latch feature 408 has passed once installed in the carpet. In this manner, the orientation of the vehicle carpet portion 400 is maintained and is prevented from rotating relative to the vehicle carpet.

Figure 5C:
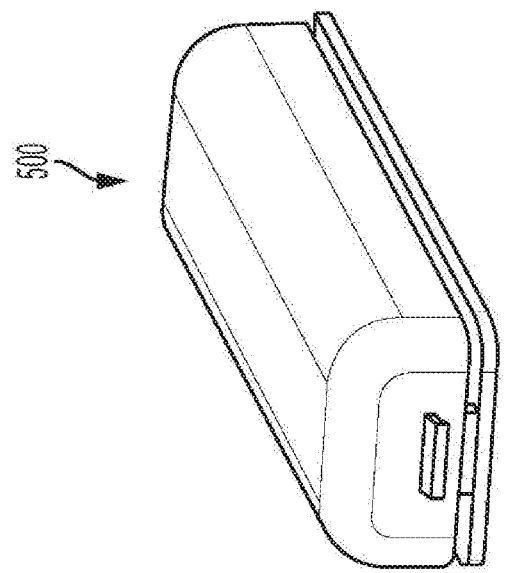
FIG. 5C is a perspective view of the vehicle floor mat portion of FIG. 5A in a closed configuration.
Figure 5B:
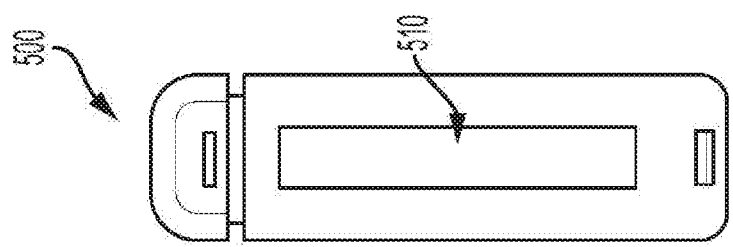
FIG. 5B is another illustration of the vehicle floor mat portion of FIG. 5A.
Figure 5A:
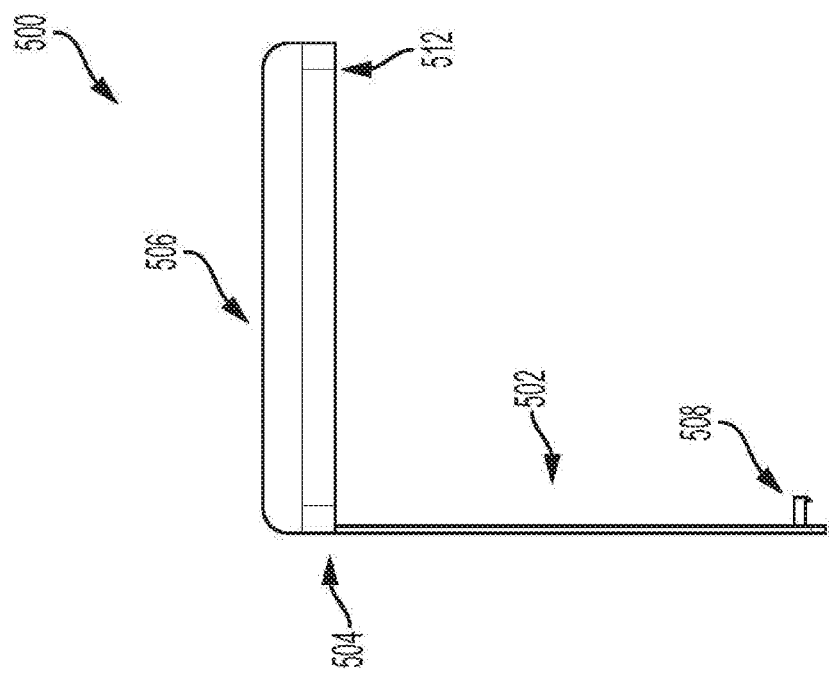
FIG. 5A is an elevation view of a vehicle floor mat portion of an exemplary floor mat retainer of the present disclosure in an open configuration.

FIGS. 5A-5C illustrate a vehicle floor mat portion 500 of the exemplary vehicle floor mat retainer in accordance with the present disclosure. The floor mat portion 500 includes a mat retainer portion 502 connected to a hinge 504 at a proximal end and a cap portion 506 that is also connected to the hinge 504. The mat retainer portion 502 further includes a latch feature 508 at a distal end thereof and defines an opening 510 configured to allow the elongate protrusion 412 of the vehicle carpet portion 400 to pass through when the vehicle floor mat portion 500 engages with the vehicle carpet portion 400. In a manner similar to that described with respect to the vehicle carpet portion 400, the vehicle floor mat portion 500 may be installed into a vehicle floor mat by passing the mat retainer portion 502 through a first opening in the floor mat. The mat retainer portion 502 may then pivot about the hinge 504 until the latch feature 508 passes through a second opening in the vehicle floor mat and engages with a complementary receiving opening 512 in the cap portion. In this manner, the vehicle floor mat portion 500 captures a vehicle floor mat between the mat retainer portion 502 and the cap portion 506. Further, the orientation of the vehicle floor mat portion 500 is fixed with respect to the floor mat in which it is installed because the vehicle floor mat portion 500 engages with the floor mat at two locations. The first location being a first opening in the floor mat through which the mat retainer portion 502 has passed and the second location being the second opening in the floor mat through which the latch feature 508 has passed. The vehicle floor mat will also define a third opening which is substantially the same size and shape and aligned with the opening 510 of the mat retainer portion 502.

Once the vehicle carpet portion 400 is installed in the vehicle carpet and the vehicle floor mat portion 500 is installed in the vehicle floor mat, the vehicle floor mat may then easily be fixed to the vehicle carpet by aligning the cap portion 506 of the vehicle floor mat portion 500 with the elongate protrusion 412 of the vehicle carpet portion 400 and then causing the elongate protrusion 412 to pass through the third opening in the vehicle floor mat, the opening 510 of the mat retainer portion 502 and into a protrusion receiving opening 514 in the cap portion 506 of the vehicle floor mat portion 500. This arrangement is illustrated in FIG. 6.

Figure 6:
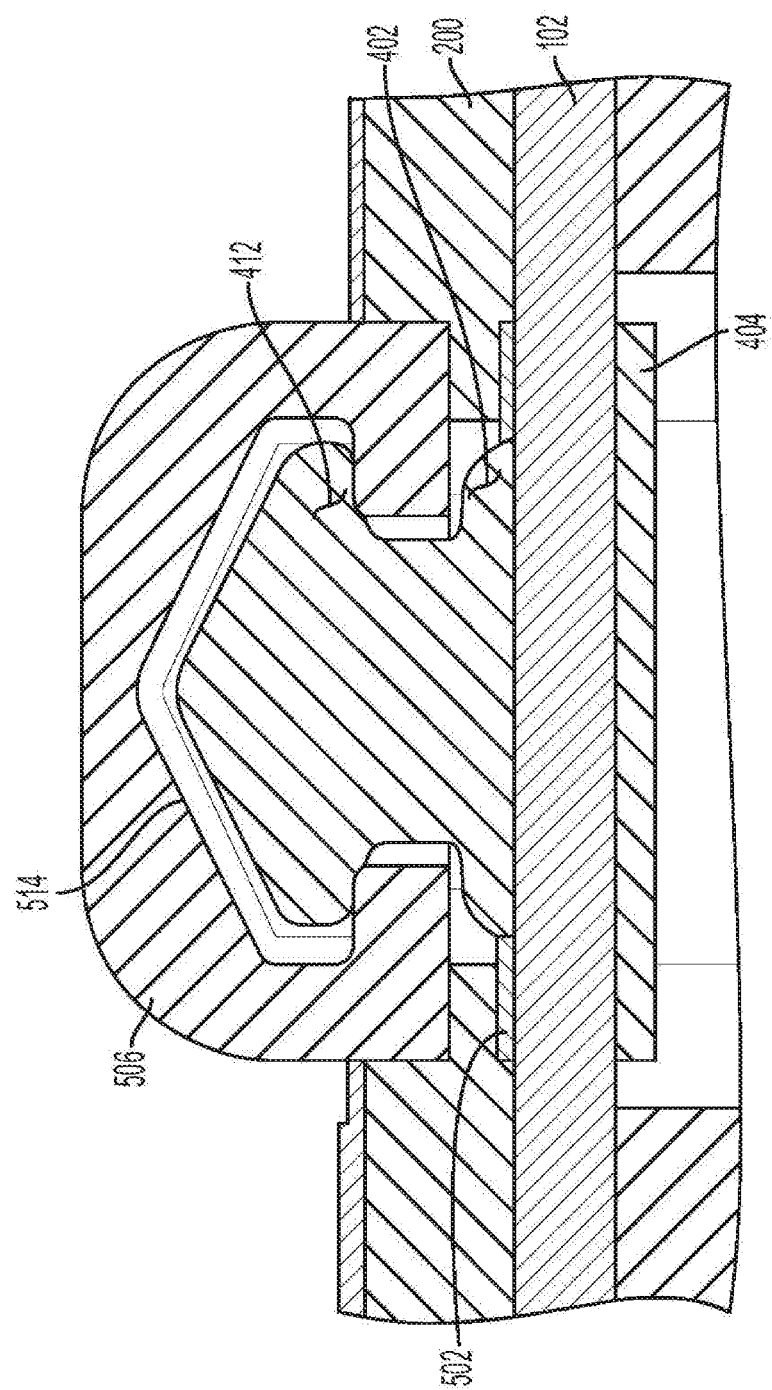
FIG. 6 is a close-up view of a cross-section taken along line I-I in FIG. 3 of an exemplary vehicle floor mat retainer installed in a vehicle in accordance with the present disclosure.

FIG. 6 is a close-up view of a cross-section taken along line I-I in FIG. 3 of an exemplary vehicle floor mat retainer installed in a vehicle in accordance with the present disclosure. The vehicle floor mat retainer includes the vehicle carpet portion 400 and the vehicle floor mat portion 500. The vehicle carpet portion 400 captures the vehicle carpet 102 between the carpet retainer portion 404 and the engagement portion 402 in the manner described previously. Further, the vehicle floor mat portion 500 captures the vehicle floor mat 200 between the mat retainer portion 502 and the cap portion 506 in the manner described previously. The elongate protrusion 412 is generally mushroom-shaped in cross-section and the cap portion 506 defines a complementarily shaped internal opening 514 that receives the elongate protrusion 412 and holds the elongate protrusion 412 within the internal opening 514 of the cap portion 506. The material of the cap portion 506 may be a resilient elastic material such that the elongate portion 412 may be removed from and/or inserted into the internal opening 514 with a minor amount force.

In contrast to conventional vehicle floor mat retention systems in which multiple retaining elements are required to maintain the orientation of the floor mat relative to the vehicle carpet, the exemplary vehicle floor mat retainer in accordance with the present disclosure maintains the orientation of the floor mat relative to the vehicle carpet at a single location. Multiple retainers are not necessary. The ability to maintain orientation of the floor mat relative to the vehicle carpet is accomplished through the engagement system previously described that maintain the orientation of the vehicle carpet portion 400 relative to the vehicle carpet and the orientation of the floor mat portion 500 relative to vehicle floor mat. This is further accomplished because the elongate protrusion 412 is configured such that, when received into the internal opening 514 of the cap portion 506 that the orientation of the vehicle carpet portion 400 is fixed relative to the floor mat portion 500. In particular, the elongate portion 412 and the complementary internal opening 514 is an elongate shape. For example, the elongate portion 412 and the internal opening 514 are at least twice as long as they are wide. This ensures that the cap portion 506 cannot rotate relative to the elongate portion 412. Preferably, the elongate portion 412 and the internal opening 514 are at least three times longer than they are wide. More preferably, the elongate portion 412 and the internal opening 514 are at least four times longer than they are wide.

Additionally, the elongate shape of the cap portion 506 may provide a top surface on which a design, logo and/or text may be positioned.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle floor mat retainer comprising:
    a vehicle carpet portion including an engagement portion connected by a first hinge to a carpet retainer portion; and
    a vehicle floor mat portion including a cap portion connected by a second hinge to a floor mat retainer portion, wherein the engagement portion includes a rectangularly-shaped elongate protrusion extending from a surface of the engagement portion, wherein the floor mat retainer portion defines a rectangularly-shaped first opening that is configured to allow the elongate protrusion to pass therethrough, and wherein the cap portion defines an internal opening that is configured to selectively capture the rectangularly-shaped elongate portion.

2. The vehicle floor mat retainer of claim 1, wherein the carpet retainer portion is connected to the first hinge at a proximal end and includes a first latch feature at a distal end.

3. The vehicle floor mat retainer of claim 2, wherein the engagement portion includes a slot that is configured to receive the first latch feature.

4. The vehicle floor mat retainer of claim 1, wherein the floor mat retainer portion is connected to the second hinge at a proximal end and includes a second latch feature at a distal end.

5. The vehicle floor mat retainer of claim 4, wherein the cap portion includes a slot that is configured to receive the second latch feature.

6. The vehicle floor mat retainer of claim 1, wherein the rectangularly-shaped elongate portion is mushroom shaped in cross-section.

7. The vehicle floor mat retainer of claim 1, wherein the internal opening is mushroom shaped in cross-section.

8. The vehicle floor mat retainer of claim 1, wherein the rectangularly-shaped elongate protrusion is more than twice as long as it is wide.

9. The vehicle floor mat retainer of claim 8, wherein the rectangularly-shaped elongate protrusion is more than three times as long as it is wide.

10. The vehicle floor mat retainer of claim 8, wherein the rectangularly-shaped elongate protrusion is more than four times as long as it is wide.

11. A vehicle including a vehicle floor, a vehicle carpet on the vehicle floor, a vehicle floor mat, and a vehicle floor mat retainer that retains the vehicle floor mat to the vehicle carpet, the vehicle floor mat retainer comprising:
    a vehicle carpet portion including an engagement portion connected by a first hinge to a carpet retainer portion; and
    a vehicle floor mat portion including a cap portion connected by a second hinge to a floor mat retainer portion, wherein the engagement portion includes a rectangularly-shaped elongate protrusion extending from a surface of the engagement portion, wherein the floor mat retainer portion defines a rectangularly-shaped first opening that is configured to allow the rectangularly-shaped elongate protrusion to pass therethrough, and wherein the cap portion defines an internal opening that is configured to selectively capture the rectangularly-shaped elongate portion.

12. The vehicle of claim 11, wherein the carpet retainer portion is connected to the first hinge at a proximal end and includes a first latch feature at a distal end and wherein the engagement portion includes a slot that is configured to receive the first latch feature.

13. The vehicle of claim 11, wherein the floor mat retainer portion is connected to the second hinge at a proximal end and includes a second latch feature at a distal end and wherein the wherein the cap portion includes a slot that is configured to receive the second latch feature.

14. The vehicle floor mat retainer of claim 11, wherein the rectangularly-shaped elongate protrusion is more than twice as long as it is wide.

15. The vehicle floor mat retainer of claim 11, wherein the rectangularly-shaped elongate protrusion is more than three times as long as it is wide.

16. The vehicle floor mat retainer of claim 11, wherein the rectangularly-shaped elongate protrusion is more than four times as long as it is wide.

* * * * *